(12) United States Patent
Takahashi et al.

(10) Patent No.: US 7,807,238 B2
(45) Date of Patent: Oct. 5, 2010

(54) ANTIGLARE FILM AND METHOD OF MANUFACTURING THE SAME

(75) Inventors: Kae Takahashi, Tokyo (JP); Hisamitsu Kameshima, Tokyo (JP); Yasuhiro Miyauchi, Tokyo (JP)

(73) Assignee: Toppan Printing Co., Ltd. (JP)

( * ) Notice: Subject to any disclaimer, the term of this patent is extended or adjusted under 35 U.S.C. 154(b) by 178 days.

(21) Appl. No.: 11/821,981

(22) Filed: Jun. 25, 2007

(65) Prior Publication Data

US 2008/0193680 A1    Aug. 14, 2008

(30) Foreign Application Priority Data

Feb. 9, 2007    (JP)    ............... 2007-030417

(51) Int. Cl.
*B32B 1/00*    (2006.01)
(52) U.S. Cl. .................. 428/1.3; 428/1.1; 428/1.5; 428/1.51; 428/411.1; 427/595; 359/615; 359/613; 349/112; 349/137
(58) Field of Classification Search .............. None
See application file for complete search history.

(56) References Cited

U.S. PATENT DOCUMENTS

| 6,710,923 | B2 * | 3/2004 | Ito | .............. 359/599 |
| 2003/0147140 | A1 * | 8/2003 | Ito | .............. 359/599 |
| 2005/0181146 | A1 * | 8/2005 | Yoneyama et al. | ......... 428/1.31 |

FOREIGN PATENT DOCUMENTS

| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-149413 | 5/2003 |
| JP | 2003-260748 | 9/2003 |
| JP | 2004-004777 | 1/2004 |
| JP | 2004-082613 | 3/2004 |
| JP | 2004-125958 | 4/2004 |

* cited by examiner

*Primary Examiner*—David R Sample
*Assistant Examiner*—Michael B Nelson
(74) *Attorney, Agent, or Firm*—Squire, Sanders & Dempsey L.L.P.

(57) ABSTRACT

One embodiment of the present invention is disclosed. A method of manufacturing an antiglare film comprising: forming a film by applying a coating liquid to a transparent substrate; and forming an antiglare layer by curing the film by irradiating the film with ionizing radiation, wherein the coating liquid includes a binder matrix forming material including an ionizing radiation-curable material, particle A and particle B, wherein difference in refractive index between either or both of particle A and particle B, and a cured binder matrix is equal to or more than 0.03, and wherein difference between average refractive index of particle A and particle B calculated based on respective weight of particle A and particle B and refractive index of a binder matrix is equal to or less than 0.03.

5 Claims, 3 Drawing Sheets (a)

(b)

ANTIGLARE FILM AND METHOD OF MANUFACTURING THE SAME

CROSS REFERENCE

This application claims priority to Japanese application number 2007-030417, filed on Feb. 9, 2007, which is incorporated by reference.

BACKGROUND OF THE INVENTION

1. Field of the Invention

The present invention relates to an antiglare film to be provided on the surface of a window, display etc. In particular, it relates to an antiglare film to be provided on the surface of such displays as a liquid crystal display (LCD), cathode-ray tube (CRT) display, plasma display (PDP), organic electroluminescence display (ELD) and field effect display (FED, SED).

2. Description of the Related Art

Displays such as a liquid crystal display, CRT display, EL display and plasma display have the following problems from the viewpoint of visibility:

External light reflects at looking and listening.

Surface glare (scintillation, dazzling) occurs at the display surface by display light from the display.

In order to solve such lowering or degradation of visibility, it is known to arrange various antiglare films on the front face of a display.

For example, a technique to form a surface irregularity by embossing a surface is known. As for an antiglare film, wherein a surface irregularity is formed in a surface of the film, a surface irregularity can be controlled perfectly. Consequently, reproducibility is good. However, when there is a defect or an adhered foreign substance on an emboss roll, endless defects occurs at the pitch of roll. Consequently, in the case of mass production, all the products have defect. Further, since the scattering only at the surface is utilized, dazzling occurs.

The following antiglare film is known: in order to control dazzling, internal scattering (internal diffusion) of light in an antiglare layer due to difference in refractive index between a binder matrix and a particle is generated by adding a particle to a binder matrix, wherein refractive index of a particle is different from a binder matrix.

As the above mentioned antiglare film, for example, the following antiglare film is known:

0.7<surface haze Hs<30, 1<internal haze Hi<15 (Japanese Patent No. 3507719)

A binder resin and plural kinds of particles are used, and difference in refractive index between the resin and the particles is 0.03-0.2. (Japanese Patent No. 3515401)

Now, an antiglare film including an antiglare film having low surface haze and high internal haze is desired with the developments in display technology. In a case where surface haze value of an antiglare film of an antiglare film is high, for example, it is more than 9%, an antiglare film arranged in the front face of a display is whitened (white blur) due to external light. This phenomenon is caused by the following fact: the probability that external light is reflected became high due to glowing in size of a liquid crystal display in late years. On the other hand, in a case where internal haze of an antiglare layer is low, for example, it is less than 15%, dazzling occurs with advancement in high definition of a display.

That is, by using an antiglare film including an antiglare layer having low surface haze and high internal haze, in a case where the antiglare film is arranged on the front surface of a display, whitening does not occur (without white blur) and dazzling does not occur.

As for an antiglare film, surface haze can be generated by adding a particle to inside of an antiglare layer and forming surface irregularity in a surface of antiglare layer by the particle. On the other hand, internal haze can be generated by adding a particle to inside of an antiglare layer, wherein refractive index of the particle is different from refractive index of a binder matrix.

So far, it was difficult to manufacture an antiglare film having low surface haze, high internal haze, no white blur and no dazzling by using only one kind of a particle, wherein refractive index of the particle is different from refractive index of a cured material of an ionizing radiation-curable material.

The purpose of the present invention is to provide a method of manufacturing easily an antiglare layer having low surface haze, high internal haze, no white blur and no dazzling by using a coating liquid including an ionizing radiation-curable material, particle A and particle B. In addition, the purpose of the present invention is to provide an antiglare film having low surface haze, high internal haze, no white blur and no dazzling.

SUMMARY OF THE INVENTION

A method of manufacturing an antiglare film is provided comprising: forming a film by applying a coating liquid to a transparent substrate; and forming an antiglare layer by curing the film by irradiating the film with ionizing radiation, wherein the coating liquid includes a binder matrix forming material including an ionizing radiation-curable material, particle A and particle B, wherein difference in refractive index between either or both of particle A and particle B, and the cured binder matrix is equal to or more than 0.03, and wherein difference between average refractive index of particle A and particle B calculated based on respective weight of particle A and particle B and refractive index of the binder matrix is equal to or less than 0.03.

In these drawings, 1 is an antiglare film; 11 is a transparent substrate; 12 is an antiglare layer; 120 is a binder matrix; 12A is a particle A; 12B is a particle B; H is average film thickness of an antiglare layer; 2 is a polarizing plate; 21 is a transparent substrate; 22 is a transparent substrate; 23 is a polarizing layer; 3 is a liquid crystal cell; 4 is a polarizing plate; 41 is a transparent substrate; 42 is a transparent substrate; 43 is a polarizing layer; 5 is a backlight unit; 7 is a polarizing plate unit; 30 is a die head; 31 is a piping; 32 is a tank for a coating liquid; 33 is a liquid supplying pump; 35 is a rotary roll.

DESCRIPTION OF THE PREFERRED EMBODIMENTS

An antiglare film of the present invention is described below

Figure 1:
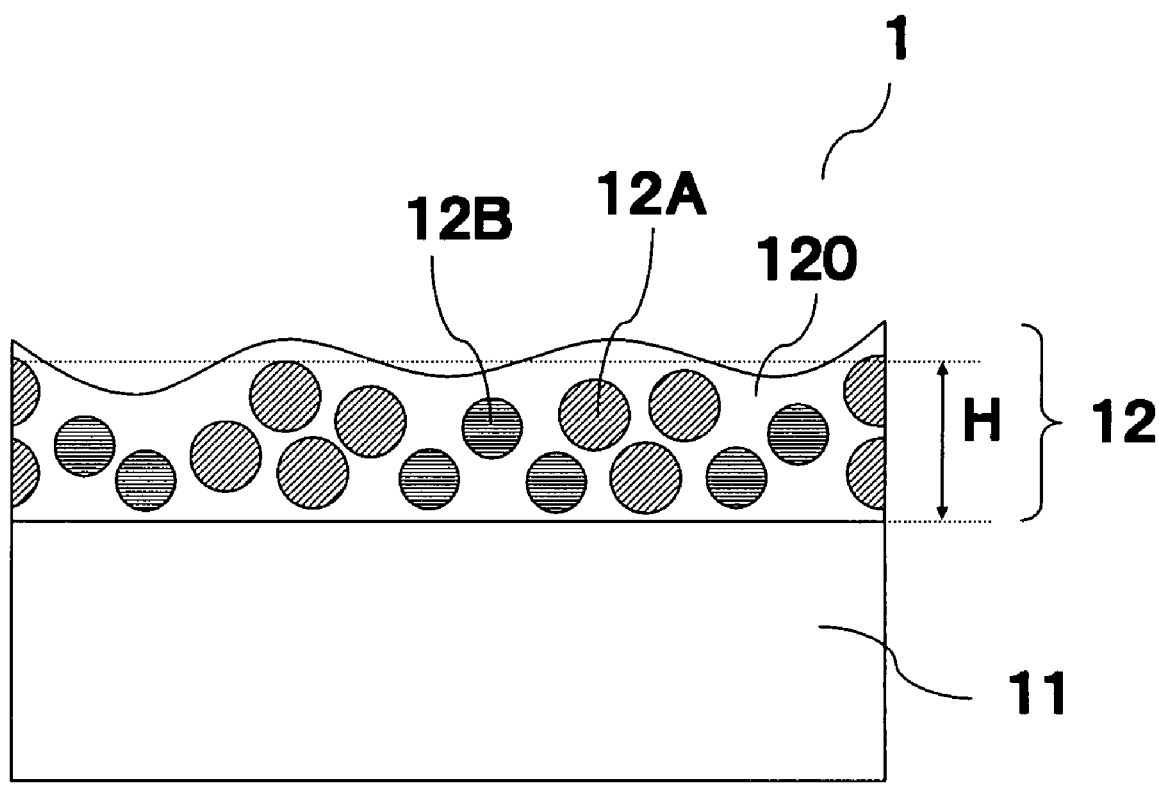
FIG. 1 is a cross section view of an embodiment of an antiglare film of the present invention.

A cross section view of an embodiment of an antiglare film of the present invention is shown in FIG. 1.

As for antiglare film (1), antiglare layer (12) is formed on transparent substrate (11), and the antiglare layer comprises binder matrix (120) including particle A(12A) and particle B(12B), wherein binder matrix (120) is formed by curing a binder matrix forming material including an ionizing radiation-curable material.

As for an antiglare film of the present invention, particles (12A and 12B) are included in binder matrix (120), and concaves and convexes are formed at a surface of antiglare layer (12), therefore the antiglare layer has surface haze value. In addition, since refractive index of particles (12A and 12B) is different from refractive index of a binder matrix, an antiglare layer has internal haze. Surface haze of an antiglare layer is a parameter expressing a level of scattering of light incident on a surface of an antiglare layer, and internal haze of an antiglare layer is a parameter expressing a level of scattering of light incident on inside of an antiglare layer.

As for an antiglare film of the present invention, it is desirable that surface haze of an antiglare layer is 1-9% and internal haze of an antiglare layer is 15-45%. In a case where surface haze of an antiglare layer is 1-9% and internal haze of an antiglare layer is 15-45%, as for an antiglare film including an antiglare layer, whitening and dazzling do not occur. In a case where surface haze of an antiglare layer is more than 9%, an antiglare film tends to be whitened. In a case where surface haze of an antiglare layer is less than 1%, external light reflection preventive properties (antiglare properties) tend to be poor. In a case where internal haze of an antiglare layer is less than 15%, dazzling of an antiglare film tends to occur. Internal haze of an antiglare layer is more than 45%, contrast of an antiglare film tends to decrease.

In FIG. 1, average film thickness of an antiglare layer to be formed is H. In the present invention, average film thickness of an antiglare layer means average value of film thickness of an antiglare layer, wherein the antiglare layer can have a surface which concaves and convexes. Average film thickness can be found by using an electronic micrometer or a full automatic detailed configuration measurement machine.

A method of manufacturing an antiglare film of the present invention is described below.

A method of manufacturing an antiglare film includes: forming a film by applying a coating liquid to a transparent substrate; and forming an antiglare layer by curing the film by irradiating the film with ionizing radiation, wherein the coating liquid includes a binder matrix forming material including an ionizing radiation-curable material, particle A and particle B, wherein difference in refractive index between either or both of particle A and particle B, and a cured binder matrix is equal to or more than 0.03, and wherein difference between average refractive index of particle A and particle B calculated based on respective weight of particle A and particle B and refractive index of a binder matrix is equal to or less than 0.03.

Inventors of the present invention found the following facts: an antiglare film having low surface haze, high internal haze, no white blur and no dazzling can be easily manufactured by using a coating liquid including a binder matrix forming material, particle A and particle B, wherein difference in refractive index between either or both of particle A and particle B, and a cured binder matrix is equal to or more than 0.03, and wherein mixing ratio of particle A and particle B is adjusted so that difference average refractive index of particle A and particle B calculated based on respective weight of particle A and particle B and refractive index of a binder matrix is equal to or less than 0.03.

In an embodiment of the present invention, difference in refractive index between either or both of particle A and particle B, and a cured binder matrix can be equal to or more than 0.03. In a case where difference in refractive index between both of particle A and particle B, and a binder matrix are less than 0.03, an antiglare layer having a desired internal haze can not be formed. In addition, in a case where average film thickness of an antiglare layer is thickened and content of a particle inside of an antiglare layer is increased in order to achieve a desired internal haze, manufacturing cost becomes high and irregularity of a film by coating tends to be significant.

Further, it is desirable that difference in refractive index between either or both of particle A and particle B, and a binder matrix is equal to or more than 0.06. In a case where difference in refractive index between either or both of particle A and particle B, and a binder matrix is equal to or more than 0.06, an antiglare layer having high internal haze can be easily formed.

In addition, it is desirable that difference in refractive index between particle A and a binder matrix and difference in refractive index between particle B and a binder matrix are equal to or less than 0.12. In a case where difference in refractive index between particle A and a binder matrix or difference in refractive index between particle B and a binder matrix is equal to or more than 0.12, internal scattering of light in an antiglare layer is too much and an antiglare layer tends to be whitened.

In an embodiment of the present invention, it is desirable that difference between average refractive index of particle A and particle B included in a used coating liquid, wherein the average refractive index is calculated based on respective weight of particle A and particle B, and refractive index of a binder matrix is equal to or less than 0.03. In a case where difference between the average refractive index and refractive index of a binder is more than 0.03, an antiglare film having low surface haze, high internal haze, no white blur and no dazzling can not be easily manufactured.

In a case where an antiglare layer is formed on a transparent substrate by using a coating liquid including particle A, particle B and a binder matrix, wherein difference between the average refractive index and refractive index of a binder is more than 0.03, surface haze and internal haze of an antiglare layer change significantly according to small change of film thickness of an antiglare layer formed on a transparent substrate, therefore manufacturing of an antiglare film of which quality is stable becomes difficult. More preferably, it is desirable that difference between the average refractive index and refractive index of a binder matrix is equal to or less than 0.02.

In the present invention, average refractive index $n_{ave}$ of particle A and particle B is expressed by the following formula 1: wherein $n_A$ is refractive index of particle A, $W_A$ is an amount (part by weight) of particle A based on a coating liquid, $n_B$ is refractive index of particle B and $W_B$ is an amount (part by weight) of particle B based on a coating liquid.

$$n_{ave} = (n_A \times W_A + n_B \times W_B)/(W_A + W_B) \quad \text{(formula 1)}$$

In addition, in the present invention, refractive index of particle A and refractive index of particle B may be same or may be different from each other. However, it is desirable that refractive index of particle A is different from refractive index of particle B and difference between "difference in refractive index between particle A and a binder matrix" and "difference in refractive index between particle B and a binder matrix" is equal to or more than 0.02. In addition, it is desirable that refractive index of one particle is less than refractive index of a binder matrix to be formed and refractive index of the other particle is more than refractive index of a binder matrix to be formed.

In addition, in an embodiment of the present invention, refractive index of a binder matrix means refractive index of a material, wherein the material is a product obtained by curing a binder matrix forming material. That is, refractive index of a binder matrix means refractive index of a material, wherein the material is obtained by curing a coating liquid without particle A and particle B. Refractive indexes of a binder matrix and particles can be measured according to the Becke line-detecting method (immersion method).

In addition, the average film thickness of an antiglare layer to be formed can be 4-10 μm and that average particle diameter of particle A and particle B can be 1-7 μm. In a case where average film thickness H of an antiglare layer to be formed is less than 4 μm, an antiglare film does not have enough hard coating performance which is necessary for the film to be arranged on a front face of a display. On the other hand, in a case where average film thickness H of an antiglare layer is more than 10 μm, manufacturing cost becomes high and irregularity of a film formed by applying a coating liquid easily occur.

In a case where average film thickness of an antiglare layer to be formed is set at 4-10 μm, it is desirable that average particle diameters of particle A and particle B are 1-7 μm. In a case where average particle diameters of particle A and particle B are less than 1 μm, a lot of particles should be included in an antiglare layer in order to achieve a desired surface haze of an antiglare layer to be formed, therefore manufacturing cost becomes high and stability of a coating liquid is lowered. On the other hand, average particle diameters of particle A and particle B are more than 7 μm, irregularity at a surface of an antiglare layer to be formed is easily generated.

In addition, in an embodiment of the present invention, total content of particle A and particle B should be 10-40 wt % based on a binder matrix. In a case where total content of particle A and particle B is less than 10 wt % based on a binder matrix, particles may nonuniformly scatter in an antiglare layer to be formed and texture of a surface of an antiglare layer tends to be poor. On the other hand, in a case where total content of particle A and particle B is more than 40 wt % based on a binder matrix, stability of a coating liquid tends to be lowered.

In an embodiment of the present invention, a coating liquid to form an antiglare layer includes a binder matrix forming material including an ionizing radiation-curable material, particle A and particle B.

Particle A and particle B used for the present invention are selected from organic particles such as acryl particle (refractive index 1.49), acryl-styrene particle (refractive index 1.49-1.59), polystyrene particle (refractive index 1.59), polycarbonate particle (refractive index 1.58) and melamine particle (refractive index 1.66), and inorganic particles such as silica particle (refractive index 1.46), talc (refractive index 1.54), various aluminosilicate (refractive index 1.50-1.60), kaolin clay (refractive index 1.53) and MgAl hydrotalcite (refractive index 1.50).

Examples of the ionizing radiation-curable material include polyfunctional acrylate resin such as acrylic or methacrylic ester of polyhydric alcohol, and polyfunctional urethane acrylate resin synthesized from diisocyanate, polyhydric alcohol and hydroxyl ester of acrylic acid or methacrylic acid. In addition to these, polyether resin having an acrylate-based functional group, polyester resin, epoxy resin, alkyd resin, spiroacetal resin, polybutadiene resin, polythiolpolyene resin can be also used.

Among the ionizing radiation-curable material, when ultraviolet ray-curable material is used, a photopolymerization initiator is added. Any photopolymerization initiator may be usable, but the use of one suitable for a material to be used is preferred. As the photopolymerization initiator, benzoin such as benzoin, benzoinmethylether, benzomethylether, benzoinisopropylether and benzylmethylketal and alkyl ethers thereof are used. The use amount of the photosensitizing agent can be 0.5-20 wt %, preferably 1-5 wt % relative to the material.

In addition, a binder matrix forming material can include a thermoplastic resin and the like besides an ionizing radiation-curable material.

Examples of the usable thermoplastic resin include cellulose derivatives such as acetylcellulose, nitrocellulose, acetylbutylcellulose, ethylcellulose and methylcellulose, vinyl-based resins such as vinyl acetate and copolymer thereof, vinyl chloride and copolymer thereof and vinylidene chloride and copolymer thereof, acetal resin such as polyvinyl formal and polyvinyl butyral, acrylic resin such as acrylate resin and copolymer thereof and methacrylate resin and copolymer thereof, polystyrene resin, polyamide resin, linear polyester resin and polycarbonate resin.

The coating liquid may contain a solvent according to need.

The solvent must be able to disperse the starting material of the binder matrix (a binder matrix forming material) and the particle (particle A and particle B). Further, the solvent is required to be provided with coating aptitude. For example, toluene, cyclohexanone, acetone, ketone, ethylcellosolve, ethylacetate, butylacetate, methyl isobutyl ketone, isopropanol methyl ethyl ketone, cyclohexanone, tetrahydrofuran, nitromethane, 1,4-dioxan, dioxolane, N-methylpyrrolidone, ethyl acetate, methyl acetate, dichloromethane, trichloromethane, trichloroethylene, ethylene chloride, trichloroethane, tetra chloroethane, N,N-dimethylformamide and chloroform can be used. In addition a combined solvent thereof can be used.

The amount of the solvent is not particularly limited.

In a coating liquid for the present invention, to the coating liquid, other functional additives may be added. But, other functional additives should not affect transparency, light diffuseness etc of an antiglare layer to be formed. Examples of the usable functional additive include an antistatic agent, an ultraviolet absorber, an infrared absorber, a refraction index-adjusting agent, an antifouling agent, a water repellent agent, an adhesiveness-improving agent and a curing agent. An antiglare layer to be formed can have functions such as an antistatic function, an ultraviolet absorbing function, an infrared absorbing function, an antifouling function and a water repellent function besides an antiglare function.

In an embodiment of the present invention, a coating liquid is applied to a transparent substrate, and a film is formed.

As the substrate for use in the antiglare film of the invention, glass, a plastic film etc. can be used. It suffices that the plastic film has a proper degree of transparency and mechanical strength. For example, such films as polyethylene terephthalate (PET), triacetylcellulose (TAC), diacetylcellulose, acetylcellulose butyrate, polyethylene naphthalate (PEN), cycloolefine polymer, polyimide, polyether sulfone (PES), polymethyl methacrylate (PMMA) and polycarbonate (PC) can be used.

When the antiglare film is used on the front face of a liquid crystal display etc., triacetylcellulose (TAC) is used preferably because it does not show optical anisotropy.

Further, a polarizing plate may be used as the substrate. There is no particular limitation on a polarizing plate to be used. For example, such polarizing plate can be used that has a stretched polyvinyl alcohol (PVA) added with iodine as a polarizing layer between a pair of triacetylcellulose (TAC) films which are supporting bodies of a polarizing layer. A polarizing plate composed of a TAC film and a stretched PVA added with iodine has a high polarization degree and can be used suitably for a liquid crystal display etc. In this case, an antiglare layer can be provided on one of triacetylcellulose (TAC) films.

A coating method using a roll coater, a reverse roll coater, a gravure coater, a knife coater, a bar coater or a die coater can be used as well as a well known methods in order to apply a coating liquid to a transparent substrate. Among them, a die coater which can apply a coating liquid at high speed by roll to roll method is preferably used. The solid content concentration of the coating liquid differs depending on a coating method. The solid content concentration may be around 30-70 wt % in weight ratio.

Figure 2:
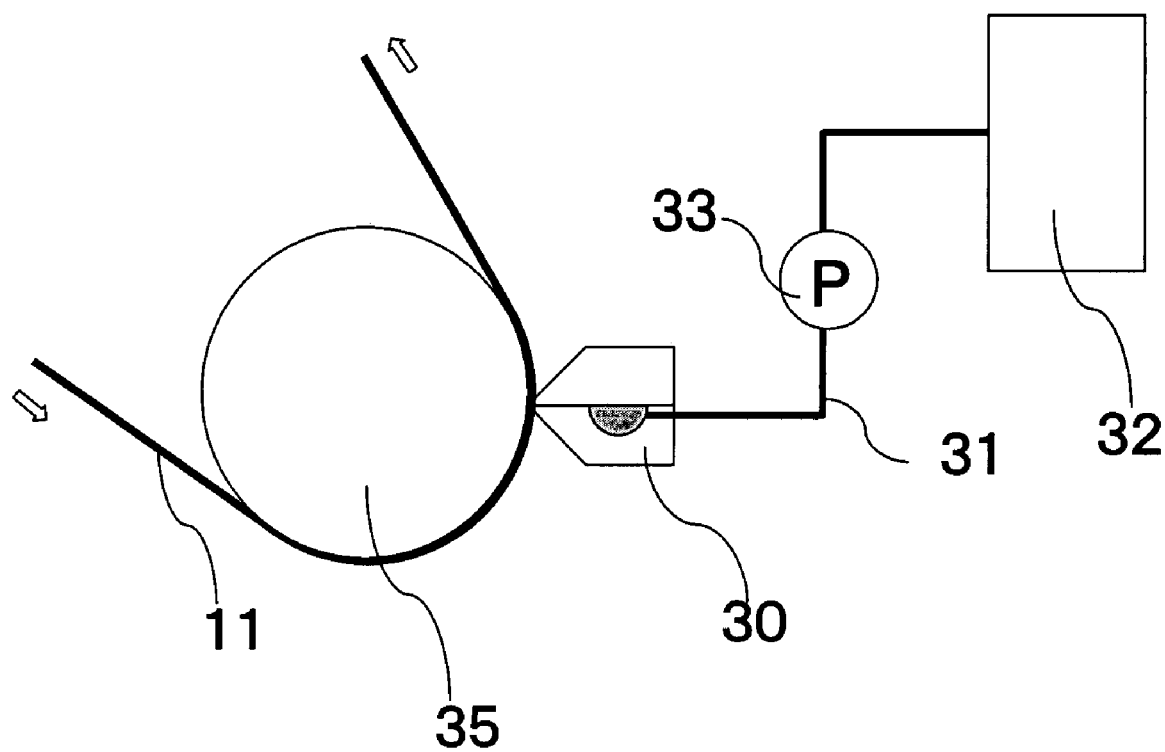
FIG. 2 is a view showing a frame format of a die coater used in the present invention.

Next, a die coater application apparatus used for the present invention is described below. FIG. 2 shows a view of a frame format of a die coater application apparatus. As for a die coater application apparatus used for the present invention, die head 30 is connected to tank 32 for a coating liquid by piping 31 and a coating liquid in tank 32 is sent to inside of die head 30 by liquid supplying pump 33. A coating liquid sent to die head 30 is discharged from a slit of die head 30 and then a film is formed on transparent substrate 11. A film can be continuously formed on transparent substrate by roll to roll method by using a winding—type transparent substrate 11 and rotary roll 35.

An antiglare layer is formed by irradiating a film with ionizing radiation, wherein the film is formed by applying a coating liquid to a transparent substrate. Usable ionizing radiation includes ultraviolet rays, electron beams.

In the case of ultraviolet curing, such light source as a high-pressure mercury lamp, a low-pressure mercury lamp, an ultrahigh-pressure mercury lamp, a metal halide lamp, a carbon arc lamp and a xenon arc lamp can be utilized.

In the case of electron beam curing, electron beams emitted from various types of electron beam accelerators such as of Cockroft-Walton type, Vandegraph type, resonance transformation type, insulated core transformer type, linear type, Dynamitron type and radio-frequency type, can be utilized. The electron beam has an energy of preferably 50-1000 KeV, more preferably 100-300 KeV.

Before and after forming an antiglare layer by the curing process, a drying process may be provided. The curing and drying may be effected simultaneously. Especially, in a case where a coating liquid includes a binder matrix, particle A, particle B and a solvent, a drying process before irradiate a formed film with ionizing radiation is necessary in order to remove a solvent included in the formed film.

Examples of drying means include heating, air blowing and hot air blowing.

An antiglare film is formed by the above mentioned process.

As mentioned above, in addition, an antiglare film can have a functional layer having a performance such as reflection preventing performance, antistatic performance, antifouling performance, electromagnetic shield performance, infrared absorbing performance, ultraviolet absorbing performance and color correcting performance. Examples of these functional layers include a reflection preventing layer, an antistatic layer, an antifouling layer, an electromagnetic shield layer, an infrared absorbing layer, an ultraviolet absorbing layer, a color correcting layer and the like. In addition, these functional layers may consist of one layer or a plural of layers. One embodiment of the functional layer is that a functional layer consisting of one layer has a plural of functions. For example, a reflection preventing layer having antifouling performance can be adopted. In addition, to improve adhesion property between a transparent substrate and an antiglare layer or between some kinds of layers, a primer layer, an adhesion layer and the like can be provided between some layers.

An antiglare film of the present invention can be used for a surface at a observer side of various displays such as a liquid crystal display (LCD), a CRT display, an organic electroluminescence display (ELD), a plasma display (PDP), surface-conduction electron-emitter display (SED), Field Emission Display (FED). The present invention provides an antiglare film which is superior in reflection preventing of external light and is superior in contrast in a case where the film is used for a display.

Figure 3:
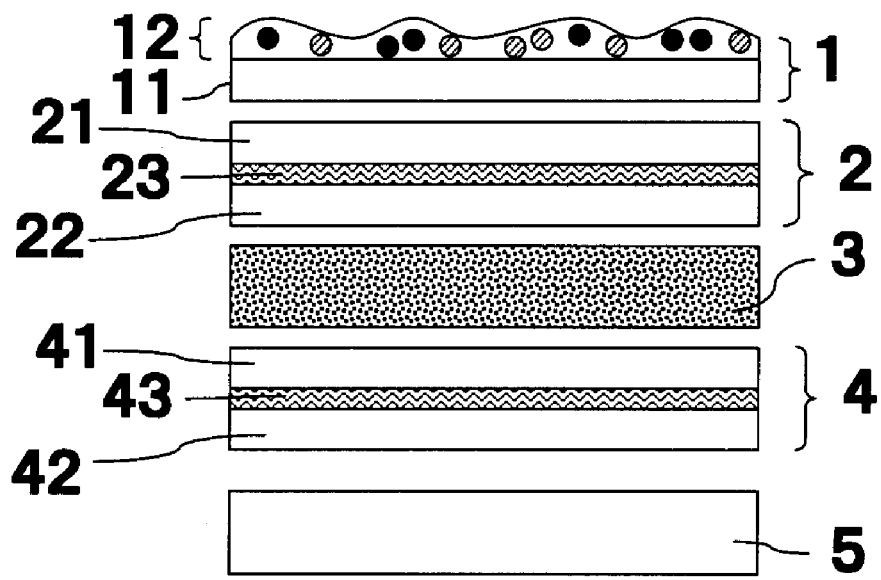
FIGS. 3(a) and (b) are cross section views of embodiments of a transmission type liquid crystal display using an antiglare film of the present invention.
Figure 3:
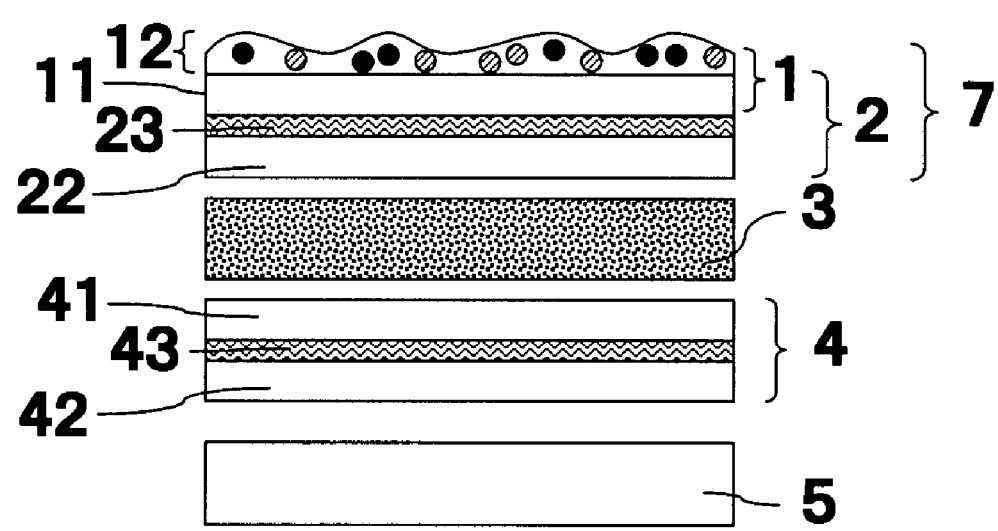

FIG. 3 is a cross-sectional view showing a transmission type liquid crystal display with the use of an antiglare film of an embodiment of the present invention. A transmission type liquid crystal display shown in FIG. 3(a) has a backlight unit (5), a polarization plate (4), a liquid crystal cell (3), a polarization plate (2) and an antiglare film (1) in this order. In this embodiment, an antiglare film (1) side is an observer side, that is, a front surface of a display.

A backlight unit (5) comprises a light source and a light diffusing plate. As for a liquid crystal cell, an electrode is provided on a transparent substrate in one side, an electrode and a color filter are provided on a transparent substrate in another side and a liquid crystal is encapsulated between both of the electrodes. As for polarization plates sandwiching a liquid crystal cell (3), polarization layers (23, 43) are between transparent substrates (21, 22, 41 and 42).

A transmission type liquid crystal display shown in FIG. 3(b) has a backlight unit (5), a polarization plate (4), a liquid crystal cell (3) and a polarization plate unit (7) which a polarization plate (2) combines with an antiglare film (1), in this order.

As for an antiglare film used for a liquid crystal display, as shown in FIG. 3(b), a polarization layer (23) can be provided on a surface of a transparent substrate (11) opposite to a surface where an antiglare layer (12) is formed, and the transparent substrate (11) can be used as a polarization plate.

One embodiment of an antiglare film of the present invention, which has low surface face, high internal haze, no white blur and no dazzling, can be obtained by the following method:

A method of manufacturing an antiglare film comprising: forming a film by applying a coating liquid to a transparent substrate; and forming an antiglare layer by curing the film by irradiating the film with ionizing radiation, wherein the coating liquid includes a binder matrix forming material including an ionizing radiation-curable material, particle A and particle B, wherein difference in refractive index between either or both of particle A and particle B, and a cured binder matrix is equal to or more than 0.03, and wherein difference between average refractive index of particle A and particle B calculated based on respective weight of particle A and particle B and refractive index of a binder matrix is equal to or less than 0.03.

EXAMPLES

Examples are described below.

Example A1

A triacetylcellulose film (TD-80U, manufactured by Fuji Photo Film Co., LTD.) was used as a substrate. On the substrate, coating liquid A having the composition shown in Table 1 was coated with a slot die coater so that average film thickness of an antiglare layer after drying was 4 µm. Then, a solvent included in the coating liquid was evaporated. Then, the antiglare layer was cured through ultraviolet irradiation of 400 mJ/cm$^2$ using a high-pressure mercury lamp under an atmosphere of 0.03% or less of oxygen concentration. Thus, a sample was prepared.

Example A2

A sample was prepared same as Example A1. However, average film thickness of an antiglare layer after drying was 5 µm.

Example A3

A sample was prepared same as Example A1. However, average film thickness of an antiglare layer after drying was 7 µm.

Example A4

A sample was prepared same as Example A1. However, average film thickness of an antiglare layer after drying was 9 µm.

Example B1

A sample was prepared same as Example A1. However, a coating liquid B was used instead of a coating liquid A and average film thickness of an antiglare layer after drying was 7 µm.

Example B2

A sample was prepared same as Example A1. However, a coating liquid B was used instead of a coating liquid A and average film thickness of an antiglare layer after drying was 9 µm.

Comparative Example C1

A sample was prepared same as Example A1. However, a coating liquid C was used instead of a coating liquid A and average film thickness of an antiglare layer after drying was 7 µm.

Comparative Example C2

A sample was prepared same as Example A1. However, a coating liquid C was used instead of a coating liquid A and average film thickness of an antiglare layer after drying was 5 µm.

Comparative Example D1

A sample was prepared same as Example A1. However, a coating liquid D was used instead of a coating liquid A and average film thickness of an antiglare layer after drying was 10 µm.

Comparative Example D2

A sample was prepared same as Example A1. However, a coating liquid D was used instead of a coating liquid A and average film thickness of an antiglare layer after drying was 17 µm.

Comparative Example E1

A sample was prepared same as Example A1. However, a coating liquid E was used instead of a coating liquid A and average film thickness of an antiglare layer after drying was 4 µm.

Comparative Example E2

A sample was prepared same as Example A1. However, a coating liquid E was used instead of a coating liquid A and average film thickness of an antiglare layer after drying was 7 µm.

TABLE 1

|  |  | Material | Refractive index | Average particle diameter | Part by weight |
|---|---|---|---|---|---|
| Coating liquid A | ultraviolet ray-curable material | ultraviolet ray-curable material A | 1.52 | — | 100 |
|  | photopolymerization initiator | photopolymerization initiator A | — | — | 5 |
|  | Particle A | Particle ① | 1.48 | 2.0 | 15 |
|  | Particle B | Particle ① | 1.59 | 3.5 | 10 |
|  | solvent | toluene | — | — | 125 |
|  | leveling agent | leveling agent A | — | — | 0.2 |
| Coating liquid B | ultraviolet ray-curable material | ultraviolet ray-curable material A | 1.52 | — | 100 |
|  | photopolymerization initiator | photopolymerization initiator A | — | — | 5 |
|  | Particle A | Particle ③ | 1.53 | 3.5 | 10 |
|  | Particle B | Particle ③ | 1.56 | 3.5 | 10 |
|  | solvent | toluene | — | — | 120 |
|  | leveling agent | leveling agent A | — | — | 0.2 |

TABLE 1-continued

|  | Material | Refractive index | Average particle diameter | Part by weight |
|---|---|---|---|---|
| Coating liquid C ultraviolet ray-curable material | ultraviolet ray-curable material A | 1.52 | — | 100 |
| photopolymerization initiator | photopolymerization initiator A | — | — | 5 |
| Particle A | Particle ③ | 1.54 | 2.0 | 10 |
| Particle B | Particle ③ | 1.54 | 3.5 | 10 |
| solvent | toluene | — | — | 120 |
| leveling agent | leveling agent A | — | — | 0.2 |
| Coating liquid D ultraviolet ray-curable material | ultraviolet ray-curable material A | 1.52 | — | 100 |
| photopolymerization initiator | photopolymerization initiator A | — | — | 5 |
| Particle A | Particle ③ | 1.54 | 2.0 | 20 |
| Particle B | Particle ③ | 1.54 | 3.5 | 20 |
| solvent | toluene | — | — | 140 |
| leveling agent | leveling agent A | — | — | 0.2 |
| Coating liquid E ultraviolet ray-curable material | ultraviolet ray-curable material A | 1.52 | — | 100 |
| photopolymerization initiator | photopolymerization initiator A | — | — | 5 |
| Particle A | Particle ① | 1.48 | 2.0 | 5 |
| Particle B | Particle ② | 1.59 | 3.5 | 15 |
| solvent | toluene | — | — | 120 |
| leveling agent | leveling agent A | — | — | 0.2 |

In the above table, ultraviolet ray-curable material A: pentaerythritol triacrylate (PE-3A, manufactured by KYOEISHA CHEMICAL Co., LTD.), photopolymerization initiator A: Irgacure 184 (manufactured by Ciba Specialty Chemicals), particle ①: silica particle (SS50F, manufactured by TOSOH SILICA),
particle ②: styrene beads (SX-350H, manufactured by Soken Chemical & Engineering Co., Ltd.),
particle ③: acrylic styrene copolymer beads (manufactured by Soken Chemical & Engineering Co., Ltd.).

<Evaluation>

In Table 2, measured results or evaluation results about surface haze, internal haze, white blur, dazzling, antiglare properties and contrast of samples obtained in Examples and Comparative Examples are shown.

<Evaluation Method>

Method of Measuring Total Haze

Total hazes of samples obtained in Examples and Comparative Examples were measured by a haze meter (NDH2000, a product of NIPPON DENSHOKU) according to JIS K7105.

Method of Measuring Internal Haze

The haze of a sample which a triacetylcellulose sheet was placed on a antiglare film through a two-sided adhesive sheet wherein the triacetylcellulose film was on a surface of an antiglare layer of the antiglare film was measured, and haze value which hazes of the two-sided adhesive sheet and the triacetylcellulose film were eliminated from the measured haze was determined to be internal haze.

Method of Measuring Surface Haze

Haze value which the inter haze was eliminated from the total haze was determined to be surface haze.

Evaluation Method of Whitening Level (White Blur)

Respective samples were laminated to respective black plastic plates using adhesive and fluorescent light was reflected in respective samples, in that state, level of light diffusing in entire of respective samples was evaluated. The judgment standard is shown below.

◎: whitening in entire sample is not observed.
○: Whitening is observed a little, and is within accepted range.
x: Whitening is observed, and is beyond accepted range.

Evaluation Method of Dazzling

A glass substrate with a black matrix (BM) of 80-200 ppi pattern was placed on a light table incorporating fluorescent light tubes and a glass substrate with an antiglare film was placed on the glass substrate with the black matrix. In this state, dazzling of an antiglare light diffusing layer was evaluated by eyes. In this evaluation, the biggest value among resolutions of BM which dazzling was not observed was determined to be the corresponding resolution.

◎: the corresponding resolution is bigger than 150 ppi.
○: the corresponding resolution is 100-150 ppi.
x: the corresponding resolution is less than 100 ppi.

Evaluation Method of Antiglare Property

Respective samples were laminated to respective black plastic plates and fluorescent light was reflected in respective samples, in that state, level of sharpness of reflecting image such as fluorescent light was evaluated by eyes. The judgment standard is shown below.

◎: sharpness of reflecting image is almost lost,
○: sharpness of reflecting image is lost, and the image is not noticeable.
x: reflecting image is sharp and the image is noticeable Respective samples were arranged on a front surface of a display, and checkered pattern consisting of white and black was displayed, and a display was placed at a position where fluorescent light and the like ware not reflected, and sensory contrast was evaluated by eyes. The judgment standard is shown below.

◎: difference between white and black is great and the checkered pattern is very sharp,
○: difference between white and black is less than the level expressed by mark ◎, and the sharpness is no problem, x: difference between white and black is not clear, and sharpness is low and the low sharpness is noticeable.

TABLE 2

| | Kind of coating liquid | Difference in refractive index between particle A and a binder matrix | Difference in refractive index between particle B and a binder matrix | Difference between the average refractive index of particle A and particle B, and refractive index of a binder matrix | Film thickness of an antiglare layer (μm) | Surface haze (%) | Internal haze (%) | whitening | dazzling | Antiglare property | contrast |
|---|---|---|---|---|---|---|---|---|---|---|---|
| Example A1 | Coating liquid A | 0.04 | 0.07 | 0.00 | 4 | 9 | 16 | ○ | ○ | ◎ | ◎ |
| Example A2 | | | | | 5 | 7 | 20 | ○ | ○ | ◎ | ◎ |
| Example A3 | | | | | 7 | 4 | 28 | ◎ | ◎ | ◎ | ◎ |
| Example A4 | | | | | 9 | 2 | 37 | ◎ | ◎ | ○ | ○ |
| Example B1 | Coating liquid B | 0.01 | 0.04 | 0.03 | 7 | 4 | 15 | ◎ | ○ | ◎ | ◎ |
| Example B2 | | | | | 9 | 1.0 | 20 | ◎ | ○ | ○ | ◎ |
| Comparative Example C1 | Coating liquid C | 0.02 | 0.02 | 0.02 | 7 | 0.8 | 13 | ◎ | x | x | ◎ |
| Comparative Example C2 | | | | | 5 | 2 | 10 | ◎ | x | ○ | ◎ |
| Comparative Example D1 | Coating liquid D | 0.02 | 0.02 | 0.02 | 10 | 10 | 22 | x | ◎ | ◎ | ◎ |
| Comparative Example D2 | | | | | 17 | 0.7 | 43 | ◎ | ◎ | x | x |
| Comparative Example E1 | Coating liquid E | 0.04 | 0.07 | 0.04 | 4 | 18 | 14 | x | ◎ | ◎ | ◎ |
| Comparative Example E2 | | | | | 7 | 6 | 50 | ○ | ◎ | ◎ | x |

In Example A1, A2, A3 and A4 using coating liquid A, which is an embodiment of the present invention, an antiglare film could be manufactured, wherein average film thickness of an antiglare layer was 4-9 μm, surface haze was 1-9%, internal haze was 15-45% and the film has no white blur and no dazzling.

In Example B1 and B2 using coating liquid B, which is an embodiment of the present invention, an antiglare film could be manufactured, wherein average film thickness of an antiglare layer was 7-9 μm, surface haze was 1-9%, internal haze was 15-45% and the film has no white blur and no dazzling. However, In Example B1 and B2 using coating liquid B, the range of average film thickness of an antiglare layer to achieve a desired surface haze and a desired internal haze was narrow compared with Example A1, A2, A3 and A4 using coating liquid A.

In Comparative Example C1 and C2 using coating liquid C, an antiglare film comprising an antiglare layer having a desired surface haze and a desired internal haze could not be manufactured. In Comparative Example C1, surface haze was less than 1% and internal haze was less than 15%. In Comparative Example C2, surface haze was equal to or more than 1%, but internal haze was less than 15%.

In Comparative Example D1 and D2, wherein content of particles based on a binder matrix forming material in coating liquid D was twice as many as content of particles based on a binder matrix forming material in coating liquid C, an antiglare film comprising an antiglare layer having a desired surface value and a desired internal haze could not be manufactured. Behavior of Surface haze and internal haze in Comparative Example D1 and D2 suggests that an antiglare film comprising an antiglare layer having a desired surface haze and a desired internal haze seems to be able to be manufactured if average film thickness of an antiglare layer is 10-17 μm. However, in a case where average film thickness of an antiglare layer to be formed is more than 10 μm, manufacturing cost is high and irregularity in a film forming is easily occurred, therefore this case using coating liquid D is not suitable for manufacturing.

In Comparative Example E1 and E2 using coating liquid E, an antiglare film comprising an antiglare layer having a desired surface haze and a desired internal haze could not be manufactured. Behavior of Surface haze and internal haze in Comparative Example E1 and E2 suggests that an antiglare film comprising an antiglare layer having a desired surface haze and a desired internal haze seems to be able to be manufactured if average film thickness of an antiglare layer is 4-7 μm. However, the range of average film thickness of an antiglare layer of an antiglare film to achieve a desired surface haze and a desired internal haze is narrow, therefore it is difficult to manufacture an antiglare film of which quality is stable.

From the mentioned above, one embodiment of an antiglare film of the present invention, which has low surface face, high internal haze, no white blur and no dazzling, can be obtained by the following method:

A method of manufacturing an antiglare film comprising: forming a film by applying a coating liquid to a transparent substrate; and forming an antiglare layer by curing the film by irradiating the film with ionizing radiation, wherein the coating liquid includes a binder matrix forming material including an ionizing radiation-curable material, particle A and particle B, wherein difference in refractive index between either or both of particle A and particle B, and a cured binder matrix is equal to or more than 0.03, and wherein difference between average refractive index of particle A and particle B calculated based on respective weight of particle A and particle B and refractive index of a binder matrix is equal to or less than 0.03.

What is claimed is:

1. An antiglare film comprising:
a transparent substrate;
an antiglare layer including a binder matrix, particle A and particle B,
wherein difference in refractive index between both of particle A and particle B, and the cured binder matrix is equal to or more than 0.04 and is equal to or less than 0.12,
wherein a refractive index of one of particle A and particle B is larger than a refractive index of a binder matrix by 0.06 or more and by 0.12 or less,
wherein a refractive index of the other one of particle A and particle B is smaller than a refractive index of a binder matrix by 0.04 or more and by 0.12 or less, and
wherein difference between the weighted average refractive index of particle A and particle B and refractive index of the binder matrix is equal to or less than 0.03.

2. The antiglare film according to claim 1,
wherein average film thickness of the antiglare layer is 4-10 μm, and
wherein average particle diameters of particle A and particle B are 1-7 μm.

3. The antiglare film according to claim 1, wherein total content of particle A and particle B based on the binder matrix is 10-40 wt %.

4. The antiglare film according to claim 1, wherein surface haze of the antiglare layer is 1-9% and internal haze of the antiglare layer is 15-45%.

5. A transmission type liquid crystal display comprising:
the antiglare film according to claim 1;
a first polarizing plate over the antiglare film;
a liquid crystal cell over the first polarized plate;
a second polarizing plate over the liquid crystal cell; and
a backlight unit over the second polarizing plate.

* * * * *